(12) United States Patent
Qian (10) Patent No.: US 7,564,828 B2
(45) Date of Patent: Jul. 21, 2009

(54) POWER-EFFICIENT SIGNALING FOR ASYMMETRIC MULTI-CARRIER COMMUNICATIONS

(75) Inventor: Feng Qian, Buffalo Grove, IL (US)

(73) Assignee: VIA Telecom Co., Ltd. (KY)

( * ) Notice: Subject to any disclaimer, the term of this patent is extended or adjusted under 35 U.S.C. 154(b) by 520 days.

(21) Appl. No.: 11/488,909

(22) Filed: Jul. 17, 2006

(65) Prior Publication Data

US 2007/0060060 A1 Mar. 15, 2007

Related U.S. Application Data

(63) Continuation-in-part of application No. 11/405,830, filed on Apr. 17, 2006.

(60) Provisional application No. 60/700,473, filed on Jul. 18, 2005, provisional application No. 60/672,917, filed on Apr. 18, 2005.

(51) Int. Cl.
*H04B 7/216* (2006.01)
(52) U.S. Cl. ............... 370/342; 370/310; 370/320; 370/328; 370/338; 370/314; 370/345; 370/394
(58) Field of Classification Search ......... 370/277, 370/278, 236, 203, 206–207, 311, 314, 320, 370/328, 338, 342, 345, 335, 394, 480; 375/145–147, 375/335; 455/59, 69, 500, 515, 522
See application file for complete search history.

(56) References Cited

U.S. PATENT DOCUMENTS

| | | | |
|---|---|---|---|
| 6,169,768 B1 * | 1/2001 | Okada et al. | 375/316 |
| 6,930,992 B2 * | 8/2005 | Qian et al. | 370/342 |
| 7,149,190 B1 | 12/2006 | Li et al. | |
| 7,359,365 B2 * | 4/2008 | Qian et al. | 370/342 |
| 2002/0061050 A1 | 5/2002 | Ozluturk et al. | |
| 2003/0086363 A1 * | 5/2003 | Hernandez | 370/208 |
| 2004/0158790 A1 * | 8/2004 | Gaal et al. | 714/748 |
| 2004/0181569 A1 | 9/2004 | Attar et al. | |
| 2004/0192218 A1 * | 9/2004 | Oprea | 455/73 |
| 2005/0094604 A1 | 5/2005 | Ozluturk et al. | |
| 2005/0135312 A1 | 6/2005 | Montojo et al. | |

(Continued)

OTHER PUBLICATIONS

Qian, Feng, Response filed in UPSTO dated Jan. 5, 2009 for related U.S. Appl. No. 11/405,830, 13 pages.

(Continued)

*Primary Examiner*—Kamran Afshar
(74) *Attorney, Agent, or Firm*—Jaquez & Associates; Martin J. Jaquez, Esq.; William C. Boling, Esq.

(57) ABSTRACT

A method and system for reducing transmission power when signaling in groups. For a group of identically-sized signals a majority value can be determined. The majority value may be transmitted as an additional signal, and all indications of the group that match the majority indication can be gated "off." The disclosed signaling method and apparatus saves transmit power. Transmit power savings generally increase as the size of the signaling group increases, as the proportion of the group sharing the majority indication increases, and as the correlation between different members of the group increases. Therefore, signaling units of ACK and/or data rate control (DRC) and/or power control information, regarding data packets conveyed on a plurality of active forward link (FL) carriers to a particular receiver, are good candidates for majority signaling.

20 Claims, 3 Drawing Sheets

U.S. PATENT DOCUMENTS

2006/0133522 A1 6/2006 Sutivong et al.
2006/0268883 A1* 11/2006 Qian et al. .................. 370/394

OTHER PUBLICATIONS

Miah, Liton, Office Action from U.S. Patent Office dated Oct. 3, 2008 in related U.S. Appl. No. 11/405,830, 15 pgs.

Qian, et al., "Power Efficient RL-ACK Signaling Scheme for NxEV-DO", 3GPP2, C-25-20050718-021, pp. 1-4, Jul. 18, 2005.

Qian, et al., "Analysis of Receiver Implementation for Nx-HRPD", 3GPP2, C25-20050516-007, pp. 1-6, May 16, 2005.

Qian, et al., "AN Receiver Implementation for HRPD RL ACK/DRC for MC-DO", 3GPP2, C30-20040114-VIA-001, pp. 1-5, Jan. 14, 2004.

Qian, et al., "DRC Channel for Multi-Carrier HRPD", 3GPP2, C30-20040518-017, pp. 1-3, May 18, 2004.

Qian, et al., "Processing of ACK and DRC for MC-HRPD", 3GPP2, C25-20050516-007, pp. 1-6, May 16, 2005.

Qian, et al., "DRC Channel for Multi-Carrier HRPD", 3GPP2, C25-20040518-028, pp. 1-3, May 18, 2004.

Qian, et al., "Reverse Link ACK for Multi-Carrier HRPD", 3GPP2, C25-20040518-027, pp. 1-3, May 18, 2004.

Qian, et al., Reverse Link ACK for Multi-Carrier HRPD, 3GPP2, C30-20040518-016, pp. 1-3, May 18, 2004.

Qian, et al., "HRPD Reverse-Link Structure Enhancement for MC-DO", 3GPP2, C30-20040114-VIA-001, pp. 1-5, Jan. 14, 2004.

Rashid Attar, "CDMA2000 Multi-Carrier HRPD Physical Layer", C25-20050314-044_QCOM_PhysicalLayer.ppt., pp. 1-7, Mar. 14, 2005.

"CDMA2000 High Rate Packet Data Air Interface Specification", 3GPP2 C.S0024-A, Version 1.0, pp. 12-1 through 13-78 (Chapters 12 and 13), Mar. 2004.

3rd Generation Partnership Project; Technical Specification Group Radio Access Network; Physical layer procedures (FDD)(Rel. 5), 3GPP TS 25.214 V5.11.0, pp. 1-51, Jun. 2005.

Liton, Miah, Office Action received from the USPTO dated Apr. 29, 2009 for related U.S. Appl. No. 11/405,830, 14 pgs.

* cited by examiner

POWER-EFFICIENT SIGNALING FOR ASYMMETRIC MULTI-CARRIER COMMUNICATIONS

CROSS REFERENCE TO RELATED APPLICATIONS

This patent application claims the benefit of priority under 35 U.S.C. § 119 (e) to commonly-assigned U.S. Provisional Application No. 60/700,473, filed Jul. 18, 2005, entitled "Power-Efficient Signaling Method and Apparatus for Asymmetric Multi-carrier Wireless Communication Systems"; and this application is a Continuation-in-Part and claims the benefit of priority to co-pending and commonly-assigned U.S. patent application Ser. No. 11/405,830, filed Apr. 17, 2006, entitled "Reverse-Link Structure for a Multi-Carrier Communication System", which application claims the benefit of U.S. Provisional Application 60/672,917, filed Apr. 18, 2005, entitled "HRPD Reverse-Link Structure Enhancement for MC-DO"; and all of the above-cited provisional and utility patent applications, including their appendices, are hereby incorporated by reference herein in their entirety as if set forth in full.

BACKGROUND

1. Field

This disclosure relates to the field of wireless communication systems, and more particularly to power-efficient transfer of signaling overhead information that is not conveyed by the highest layers in a layered communication system.

2. Related Art

The subject matter set forth herein is applicable to wireless communication systems that multiplex signals using techniques of time division multiplexing (TDM), code division multiplexing (CDM), and frequency division multiplexing (FDM). However, it has been developed primarily in the context of CDMA (Code Division Multiple Access) cellular telecommunication systems that provide high-speed connectivity including data and voice transport on both point-to-point and point-to-multipoint bases. First-generation (analog) and second-generation (digital) cellular networks were used primarily for communicating voice traffic via mobile cellular telephones, and thus maintained a focus on access methods for the efficient transport of voice information. With the rising popularity of the Internet, a third-generation (3G) wideband multimedia cellular network continues to be developed to transport both voice and data at much higher speeds than were previously available using the first and second generation wireless networks.

A Third Generation Partnership Project 2 (3GPP2) has been established by industry groups for the purpose of defining specifications to transition current code-division multiple-access (CDMA) wireless networks to the third generation, which is commonly referred to as CDMA2000. One such specification may be referred to as "IS-856," also called (CDMA system) "EV-DO." Rev 0 and Rev A IS-856 specifications have been published and are available from the 3GPP2 organization as IS-856 and IS-856-A (also C.S0024-A, C.S0024-B), and are incorporated by reference herein in their entireties for teachings on communications protocols used in 3G wireless communications systems.

The 3GPP2 organization is primarily concerned with defining specifications for CDMA systems such as are implemented in North America. A document specifying a somewhat different CDMA system, such as is used more commonly in Europe, may be identified as 3GPP TSG-RAN Release-5, and is hereby incorporated by reference for its teachings on CDMA systems.

Cellular communications systems traditionally provided almost exclusively telephone voice connectivity, with data transfer only in support of the voice connection or as possible with audio-frequency modems. The systems are evolving toward an ability to convey high rate packet data "HRPD" between base stations ("BSs") or "Access Networks" ("ANs") to mobile stations ("MSs") or "Access Terminals" ("ATs").

European countries have previously employed GSM technology for telephone operation, which is based on time division multiplexing ("TDM"). As the European systems are modified to accommodate high rate packet data, CDMA is being adopted as a new technology. Being new, no provision need be made for MSs or BSs configured to operate in accordance with earlier generation or "legacy" CDMA standards. These countries are adopting a wideband version of CDMA, WCDMA, which employs a 5 MHz physical communication channel that is four times as large as the 1.25 MHz bandwidth of carriers in existing CDMA systems, such as are widely deployed in the United States.

In countries such as the United States that have a large installed base of CDMA systems, it will be useful to increase high speed data communication capacity while remaining compatible with legacy devices and architectures. This issue has been addressed in many papers submitted to the 3GGP2 organization, such as C30-20050314-044R1_QCOM_MultiCarrier_HRPD_PhysicalLayer.pdf.

Packet data communications typically rely on transmitting packets at the minimal power that is statistically likely to cause correct reception. The power of signals transmitted to other receivers appears as general "noise" to a particular receiver (e.g., an MS) to which the signals are not directed, reducing their ability to correctly receive their own signals. Thus, minimizing power is well understood to leave system capacity to serve more receivers, which is very desirable. Employing minimum power for a particular packet necessarily entails a statistical probability of transmitting unsuccessfully. Unsuccessfully transmitted packets must be retransmitted, or otherwise clarified, to ensure that the data is ultimately received correctly. Consequently, Automatic Retransmission reQuest (ARQ) techniques are employed that rely on reverse link acknowledgment signaling to enhance data transfer efficiency.

Acknowledgement signaling is generally not conveyed by the highest layers in a layered communication system, but is typically restricted to Media Access Control (MAC) layers and/or the lower Physical layer. RL transmission of information strictly in support of FL data transfers, such as acknowledgment and DRC information, constitutes signaling "overhead." It is desirable to reduce the proportion of bandwidth and power that must be allocated for such overhead, while increasing the amount of FL data that is conveyed.

Transmission protocols that are efficient for data communication, as opposed to voice communication, may be called "data only" or simply "DO." Unlike basic voice transmissions, packet data transmission is often asymmetric between a forward link (FL) and a reverse link (RL), as a data file, for example, is transferred on the FL direction without corresponding data transmission on the RL. Indeed, the designation as FL and RL may be taken to reflect a direction of primary data transfer, and need not refer to transmissions from a serving base station and from a terminal station, respectively. Typically, however, the FL direction is from an Access Network station to an Access Terminal station.

Where legacy CDMA systems having preexisting channel carriers allocated (typically occupying spectrum with a bandwidth of 1.25 MHz or 5 MHz), it may be useful to increase data transmission rates while retaining the preexisting channel carrier allocations. To do so, it is possible to transmit data concurrently through a plurality of different FL channel carriers (of, e.g., 1.25 MHz or 5 MHz each). Such plural-carrier transmissions are referred to as "multicarrier" transmissions for data only, or MC-DO. As data rates continue to increase, even WCDMA, which has a larger carrier bandwidth than standard CDMA, will benefit from multicarrier operation.

In order to maximize system capacity, there is a need to select an architecture and protocol that will permit asymmetric MC-DO transmissions to be as efficient as possible. Existing proposals do not gracefully enable a single RL feedback carrier to convey acknowledgment and DRC information for a multiplicity of FL carriers. The method and system set forth herein address the need for efficient and expandable operation at continuously increasing data rates, while retaining compatibility with legacy systems, and thus resolve the problems noted above.

SUMMARY

A method and related apparatus are disclosed for transmitting signaling information with reduced transmit power. Groups of related signaling information units (SIUs) are compared, and a Majority signaling information unit is determined as that SIU having the most common value within the group. When SIUs can take on only two values, the Majority SIU will match at least half of the SIUs in a group; for multiple-state SIUs, the majority SIU should be common to at least two SIUs. The Majority SIU is assigned to an additional signaling unit. The group of SIUs, including the extra Majority SIU, is transmitted, with each SIU assigned to an identifiable space that is defined by any combination of frequency, code or time position. Aside from the extra Majority SIU, every other SIU having that value is gated off to a "DTX" (disable transmission) condition. The absence of data in the space assigned to an SIU may be interpreted by the receiver as a value equal to that of the Majority SIU. Power savings increase when there is correlation between the SIUs, such that the Majority SIU is common to a relatively larger proportion of the signaling SIUs of the group. The method and apparatus are therefore particularly well suited to multi-carrier, data only (MC-DO) communications in which signaling is needed in respect of a multiplicity of different carrier frequencies on which data packets are concurrently being conveyed between a data source and a data receiver. Data packet acknowledgment information (ACK/NAK), data rate control (DRC) information, and power control information are some examples of information that may be useful in respect of the group of different carriers that is active in an MC-DO connection.

One aspect is a method of transmitting a group of related and common-sized signaling information units ("SIUs"), and includes determining N SIU values corresponding to and associated with each of N related SIUs to be transmitted. From among these N SIU values, a majority SIU value is identified, and represented in a MajoritySIU distinct from all of the N SIUs. The method further includes transmitting the N SIUs and the MajoritySIU to a receiver as a signaling message having N+1 corresponding distinct SIU spaces within the signaling message, by transmitting, in the space corresponding to the MajoritySIU, a signal reflecting the value of the MajoritySIU; in the spaces corresponding to the SIUs having values unequal to the MajoritySIU value, transmitting signals reflecting each such value; and, in the spaces corresponding to the SIUs having values equal to the MajoritySIU, transmitting an absence of signal.

Another aspect includes communication apparatus for transmitting a group of related and common-sized signaling information units ("SIUs") to a particular receiving station. The apparatus includes an SIU group value determination module configured to determine N SIU values corresponding to each of N related SIUs to be transmitted; a MajoritySIU value determination module configured to determine a largest number, greater than one, of the N SIU values that are equal to each other, and configured to assign such SIU value as the MajoritySIU value; and a majority masking module configured to identify each of the N SIUs having a value matching the MajoritySIU, and configured to indicate that such SIU is to be represented in transmission by an absence of signal. The apparatus also includes a transmission signal preparation module configured to prepare a signaling message having N+1 assigned signal spaces corresponding to the N SIUs and the MajoritySIU. The resulting signaling message includes a signal reflecting the value of the MajoritySIU disposed in the space corresponding to the MajoritySIU, a signal reflecting the value of each SIU of the group, the value of which is different from the MajoritySIU in the space corresponding to such SIU, and an absence of signal in each space corresponding to an SIU having a value equal to the MajoritySIU value.

DETAILED DESCRIPTION

Terminology

A carrier, or carrier spectrum, is a frequency range of electromagnetic spectrum. In CDMA communications, a carrier may be modulated to convey a multitude of channels distinguished by different codes. As used herein, carriers are assumed to have a fixed bandwidth, though in principle they could be variable. Carriers may, for example, have a bandwidth of 1.25 MHz as is specified by presently-supported standards for CDMA communications in the United States, or a 5 MHz bandwidth as specified for WCDMA systems.

Asymmetric communication has two distinct meanings. In many communication systems, especially point-to-multipoint systems, a great deal more data is expected to be communicated from a base station point to the numerous remote stations (multipoints) served by the base station. Thus, special protocols and carrier assignments may be made to accommodate such serving station/served station asymmetry. However, between any two stations that are in communication, there may be a data transfer asymmetry that varies over time depending on the current direction of primary data transfer. This situation differs from ordinary full-duplex telephone voice operation, in which data transfer is more nearly equal in each direction. As between a serving base station sector and a served station, either station may be the primary source of data over a particular period of time.

In the description herein, therefore, the serving station (also called base station "BS" or access network "AN") is not assumed to necessarily be the data source station, nor is a served station (e.g., a mobile station "MS," user equipment "UE," or access terminal "AT") assumed to necessarily be the data receiving station. However, due to the overall asymmetry in serving vs. served station data transmissions, a serving station will typically be the data source station for asymmetric data transmission. In view of the overall asymmetry, the methods described herein to facilitate asymmetric data communication need not be implemented similarly in BSs and MSs. Some embodiments of aspects of the method described herein may be reserved for the typical circumstance when the data source is a BS, while in other embodiments the method may be reserved for the less typical circumstance in which the data source station is an MS. Implementations for these two alternatives will generally differ, at least due to differences between BS and MS protocols as defined in the CDMA standards that are presently supported.

To maintain generality, then, forward link (FL) transmissions may refer to those from a data source station to a data receiving station, even though FL typically refers to transmissions from a BS to an MS. Similarly, reverse link (RL) may refer to any communication from a station that is presently primarily receiving data from another, and is not restricted to communication from an MS to a BS.

Asymmetric Multi-Carrier Data Communication

Figure 1:
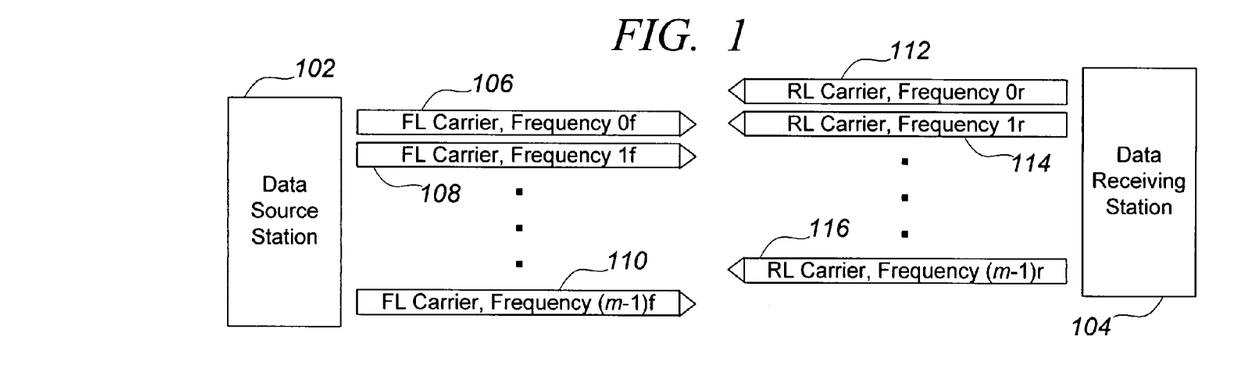
FIG. 1 represents relationships between uplink and downlink carrier spectra in a system for asymmetric data communication.

As represented in FIG. 1, a data source station 102 may transmit signals to a data receiving station 104 over one or more of m available forward link (FL) carriers 0f, 1f, . . . (m−1)f (as represented by bands 106, 108 and 110, respectively). Reverse link (RL) carriers 0r, 1r, . . . (m−1)r (as represented by bands 112, 114 and 116, respectively) are shown corresponding to each FL carrier for generality. The correspondence between FL and RL carriers is typically established as a convention of the applicable system definition. Corresponding FL and RL carrier pairs in CDMA systems deployed in the United States are typically offset by a predetermined offset frequency. However, any predetermined pairing may be used to the same effect.

In accordance with CDMA standards as presently supported, a single FL carrier is selected for data transmission from a data source station to a data receiving station. At least two items of feedback information are transmitted on the corresponding RL carrier from the receiving station to the data source station: acknowledgment information with respect to each data packet already received by the receiving station, and data rate control (DRC) information. The DRC information comprises feedback information, in that it reflects the success of previous data rates, but also establishes a future data rate so that the receiving station can readily decode subsequent data.

To increase the rate at which data can be transferred, it will be useful to transmit data on a multiplicity of FL carriers. One goal is to support data transmission from a data source station to a data receiving station concurrently on up to fifteen FL carriers. Data transmission from a single data source station to a particular receiving station, concurrently on a plurality of different FL carriers, will be generally referred to as "multicarrier" data transmission.

Data packets transmitted on one carrier are, of course, entirely separate from those transmitted on another. As such, efficient data communication protocols require the receiving station to return acknowledgment and DRC information, as noted above, with respect to each carrier on which a data packet is transmitted. There are advantages to conveying all such feedback information on a single RL carrier. For example, it can avoid a need for a receiving station to transmit concurrently on a plurality of frequencies, which reduces the hardware requirements for such stations.

The first FL carrier selected for data transmission immediately implicates the corresponding RL carrier for feedback information, in accordance with standardized protocols. For consistency with single-carrier data transmission, multi-carrier data transmission may require feedback information to be transmitted on the RL carrier corresponding to a first-selected FL carrier. Different assignments for the RL feedback carrier, however, are acceptable if they are established by convention. It will be useful if the RL carrier is sufficient to convey all of the feedback information for all of the FL carriers that concurrently transmit data packets. Moreover, in the interest of backward compatibility, it will be helpful if the acknowledgment and DRC information is conveyed via the same CDMA channels as are specified by currently-supported CDMA standards. Using the same CDMA channels may avoid a need to modify hardware in the large number of CDMA BSs that are already deployed.

FIG. 1 represents a system for multicarrier FL data transmission with single carrier RL transmission of acknowledgment and/or data rate control (DRC) information, under the following conditions. A plurality of the forward link carriers from the data source station 102, 0f . . . (m−1)f (represented by arrows 106, 108 and 110, respectively), concurrently transmit packets to the data receiving station 104. After receiving the packets, the data receiving station 104 determines acknowledgment status for each packet, and/or determines data rate control (DRC) information with respect to each channel conveying a data packet. The data receiving station 104 creates one or more messages containing such acknowledgment and/or DRC information, and transmits such information to the data source station 102 by modulating only a single RL carrier, such as the RL Carrier, Frequency 0r (112). Any of the techniques of signaling transmission and reception that are described herein may be employed by such a system, such that each different signaling technique thereby establishes another embodiment of the multicarrier FL data transmission with single carrier RL transmission of acknowledgment and/or DRC information.

Both the data source station 102 and the data receiving station 104 may include various modules to effect their respective operations. Indeed, it is fair to consider that these devices include a module to perform each and every task. Modules are functional in nature, and may include parts in different assemblies, and/or may include software for execution on a processor (typically a special purpose data processor, although other processor types can be used to practice the present teachings). Therefore, if a step in a method is described herein for a data source station or a data receiving station, it may be said that the respective station includes a module configured to perform such step. Because the modules may be implemented in a wide variety of different ways, construction of the stations becomes extremely flexible with such a modular approach.

Multicarrier Acknowledgment Signaling

Figure 2:
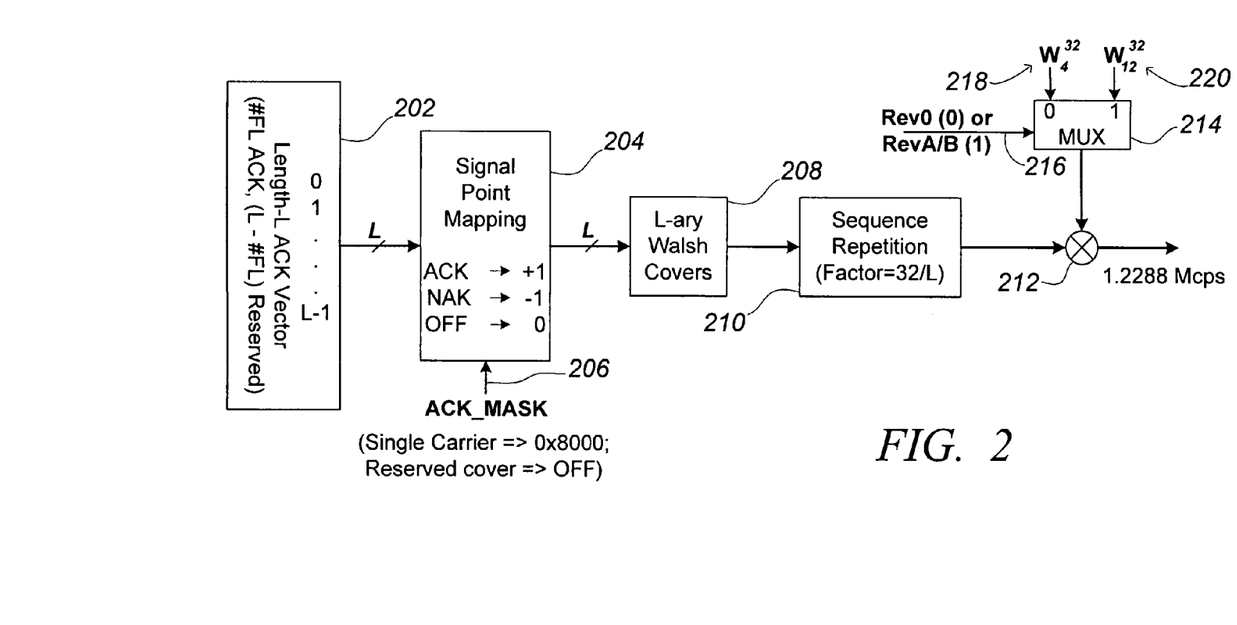
FIG. 2 is a block diagram of processing steps for exemplary acknowledgment channel processing for asymmetric multi-carrier data communication.

FIG. 2 illustrates a signal processing block diagram for providing multicarrier acknowledgment feedback on a selected CDMA channel. FIG. 2 illustrates acknowledgment processing for a variable number of up to L different FL carriers. L has a value of $2^n$, n a positive integer $0<n$, but in most circumstances $L<=16$. The number of FL carriers supported is indicated as #FL. #FL $<=L$.

Block 202 provides information, typically binary, reflecting the packet acknowledgment status for each of the #FL supported FL carriers. Determining the nature and value of the data may be done in any conventional way, whether old, or as may be implemented in the future. Such determination is well understood, and is beyond the scope of this disclosure. In one embodiment, acknowledgment of up to fifteen FL carriers is supported (#FL=15). In that case, the extra data bit (L−#FL) may be reserved as is described below in more detail. One or more extra or reserved bits are available whenever the number of supported FL carriers is not $2^n$. If the number of supported FL carriers is 2 or 4, however, it will be more efficient not to reserve any bits, but instead to provide data only for such 2 or 4 supported FL carriers.

Block 202 thus concurrently provides L bits, including at least one bit for each supported FL carriers, i.e., 2, 4, 8 or 16 bits. The bits are typically logical binary representations, and are provided to a signal point mapping block 204. ACK (positive acknowledgment of a particular packet as having been received correctly) may, for example, be indicated by a logical zero, while NAK (negative acknowledgment that a particular packet was not received correctly) may be indicated by a logical one. These incoming binary bits may be translated by the block 204 to +1 and −1, respectively. Any present or later-adopted conventional signal mapping assignment is satisfactory.

Incoming logical binary data is recognized, by definition, as either logical one or zero, and thus the signal point mapping block 204 will recognize L values (the number of supported FL carriers #FL plus reserved bits). However, all supported FL carriers may not presently have an actively transmitted packet for which acknowledgment is required. One way to accommodate such a variable number of active FL carriers is to provide an ACK_MASK as an input 206 to the signal point mapping block 204. For those supported FL carriers that are not presently active, the ACK_MASK may force the block 204 to output a zero rather than a +1 or a −1 symbol (binary phase shift keyed "BPSK" symbols). For example, when only a single FL carrier has transmitted a packet, ACK_MASK may assert a value of 0×8000, such that only the bit corresponding to FL carrier 0f is mapped to an active signal value of +1 or −1, while all others are mapped to no signal (0).

As illustrated, the ACK_MASK also disables the reserved bit. However, the reserved bit may be enabled at different times or for different signaling protocols, as described in more detail below.

The block 204 thus may concurrently provide up to L active signal symbols to a Walsh cover block 208. Block 208 performs a length-L Walsh transform on the incoming symbols, spreading the up-to L symbols into a length-L sequence. This process effectively Walsh covers each active signal, and then combines the covered signals into a combined length-L sequence. It may be useful to assign Walsh 0 to the bit that acknowledges packets on the FL carrier frequency 0f that corresponds to the RL carrier frequency 0r employed for the ACK channel. In other words, Walsh 0 should be applied to the FL carrier that is normally paired to the RL carrier being used for feedback. Thereby, when only a single FL carrier is active, the system may conform to a previous CDMA standard. For convenience, additional FL carriers for which packet acknowledgment is needed may be implicitly assigned to other Walsh codes based on their relative index to the FL carrier that corresponds to the RL carrier. The Walsh codes need not be assigned in numeric order, and indeed may be better assigned in accordance with development via the Walsh tree. Thereby, when fewer concurrent FL packets are supported (or require acknowledgment), Walsh codes involving fewer adjacent state changes may be applied to simplify hardware processing in some instances.

Presuming that L<32, the sequence produced by the Walsh cover block 208 is repeated at a block 210 by a factor of 32/L. However, the overall sequence length may vary in other embodiments. Many embodiments will maintain a time duration for the resulting (i.e., after any repetition) acknowledgment symbol sequence that is the same as is used for supported versions of a CDMA system. By maintaining the same physical duration, the number of symbols may be varied while permitting the sequence to occupy the transmission time interval (TTI) specified by a previous CDMA standard, such as one half standard slot. The actual number of symbols may be varied by varying the symbol rate.

It should be noted that the processing indicated in FIG. 2 illustrates concepts to be effected, and actual implementation may take many forms. The block 210, for example, may be implemented by a command to the block 208 to generate the Walsh covered sequence twice from a given set of symbols provided from the block 204. A gain stage, not shown, may be provided after the block 204. The location of the gain stage may affect the implementation of subsequent processing blocks, as will be readily understood by those of skill in the art.

The symbol sequence from the block 210 enters a modulation stage 212, where it is modulated onto a Walsh channel. The Walsh channel may be selected by a MUX 214 from among Walsh channels that are employed for acknowledgment information in presently-supported versions of CDMA standards. In particular, for example, if an input 216 indicates (e.g., with a zero) that the data source station is configured in accordance with Rev 0 of IS-856 (TIA/EIA IS-856), then a first Walsh code 218 will be applied to modulate the sequence (e.g., length-32 Walsh code number 4). Otherwise, input 216 will indicate (by value "1") that the data source station is configured in accordance with IS-856-A or subsequent IS-856-B (TIA/EIA IS-856-A, TIA/EIA IS-856-B). In that event, a different Walsh code 220 will be applied (e.g., length-32 Walsh code number 12). The indicated processing will result in a 32 symbol sequence which will occupy one half of an ordinary data slot, modulated by the appropriate Walsh code (e.g., at 1.2288 Mcps). Thus, it is consistent in this regard with the Walsh channel and timing configuration specified in currently-supported CDMA standards for data acknowledgment signaling. TIA/EIA IS-856, IS-856-A and so much of IS-856-B as has been published are all hereby incorporated in their entireties by reference for their teaching in regard to high speed packet data CDMA devices and procedures.

Many alternative implementations of Multicarrier Acknowledgement Signaling are consistent with the foregoing. Certain general techniques for such implementations may provide benefit. For example, sensitivity to burst fading may be reduced by configuring the signal processing such that, when possible, redundancy is achieved by repeating sequences rather than by repeating bits.

Multicarrier DRC Signaling

To maintain consistency with the coding of the DRC (data rate control) signal in accordance with standards that remain supported, extension to multicarrier operation may best be effected by establishing a combined DRC symbol sequence that has a duration depending upon the number of FL carriers for which DRC is needed. The number of FL carriers for which DRC is needed may be referred to as the number of rate controlled channels, and indicated as "#RCC."

Figure 3:
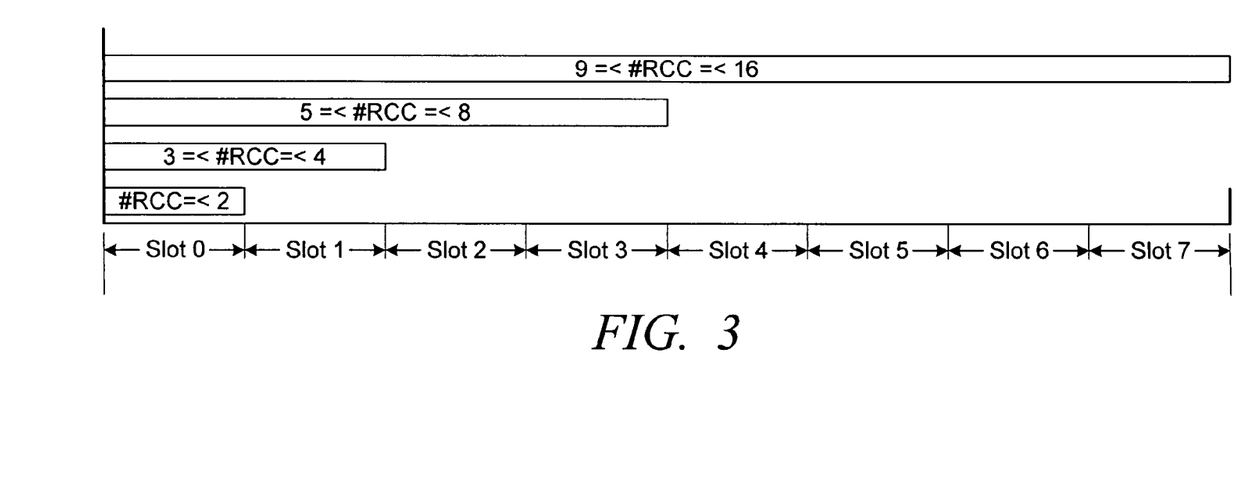
FIG. 3 illustrates the length, in slots, of extended DRC packets.

Let K be the smallest number such that $K=2^n$, and $K>=\#RCC$. Then the number of standard data slots required to convey a multicarrier DRC sequence, as described below in more detail, is K/2 standard slots. FIG. 3 illustrates the relationship between the DRC sequence length and a standard slot duration. The length of the bars, in slots, is the duration of the DRC frame. As may be seen, if 1 or 2 FL carriers require DRC, then the sequence length need only be the length of one standard slot (slot 0). As the number of FL carriers for which DRC is provided increases to 3 or 4, two slots are required, and so on, until 8 slots are required to accommodate the DRC frame that indicates DRC information for up to 15 or even 16 FL carriers.

Figure 4:
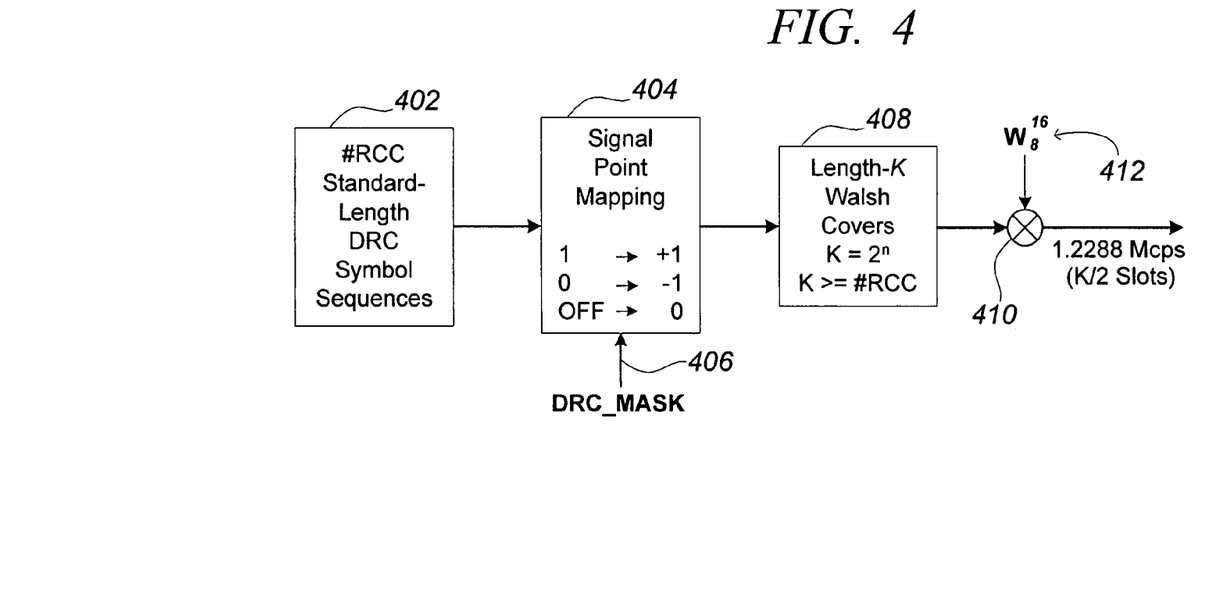
FIG. 4 is a block diagram of processing steps for exemplary DRC channel processing for asymmetric multi-carrier data communication.

The DRC frame may be developed as shown in FIG. 4. A block 402 represents the development of as many binary DRC sequences as are needed (#RCC) for the supported FL carriers. As defined in currently-supported CDMA standards, the DRC for a particular carrier is indicated by a 4-bit bi-orthogonally encoded symbol, which is covered with a 3-bit Walsh cover to generate a length-64 binary sequence. The block 402 is configured to provide DRC for the maximum number of FL carriers supported for concurrent data transmission.

A signal point mapping block 404 accepts the binary output from the block 402 and maps the binary data to BPSK +1, −1 signal symbols. Because the maximum number of supported FL carriers does not always require a DRC indication, a DRC_MASK is provided at an input 406 of the block 404 to ensure that inactive DRC sequences are converted to DTX or zero symbols. Thus, #RCC sequences are forwarded to a Walsh cover block 408. A value K is selected as the smallest value for which $K=2^n$ and $K>=\#RCC$. Length-K Walsh covering of each symbol of the incoming sequences converts the #RCC incoming length-64 sequences to a single length 64K sequence. The resulting length 64K sequence is modulated by a modulator 410 with the Walsh code 412 at the chip rate (e.g., 1.2288 Mcps). As described above, the final sequence may extend over up to 8 standard slots, depending upon the #RCC of FL carriers for which DRC is being provided.

Reserved Bit(s)

As described above, when #FL (the number of FL carriers for which concurrent acknowledgment is supported) is less than L (where $L>=\#FL$, $L=2^n$), at least one reserved bit is available. Such a bit may be used for any one of a number of purposes. A single bit may, for example, be used as a parity bit for all of the acknowledgment bits. Other uses are described below.

As the number of active FL carriers for which acknowledgment is required increases, the transmit power for the RL acknowledgment channel will generally also increase. Therefore, an extra bit may be used to reduce the transmit power. For example, a single bit may indicate that signaling is being modified from BPSK signaling to On/Off signaling in order to reduce power. As an example of On/Off signaling, NAK may be encoded as "Off." The data source station will ignore those particular FLs on which packets were not sent, or otherwise do not require acknowledgment.

Majority Channel Signaling

When a multiplicity of a particular size of signaling information units destined for a particular communication station are related they may be transmitted in groups. Transmit power may be reduced by transmitting an extra signaling unit with the group to indicate the most common value of the group. The signaling units of the group that match that common value may then be gated off (DTX).

Generally, groups of related signaling information units (SIUs) are compared, and a Majority signaling information unit is determined as that SIU having the most common value within the group. When SIUs can take on only two values, the Majority SIU will match at least half of the SIUs in a group. For multiple-state SIUs, the majority SIU should be common to at least two SIUs. The Majority SIU is assigned to an additional signaling unit. The group of SIUs, including the extra Majority SIU, is transmitted, with each SIU assigned to an identifiable space that is defined by any combination of frequency, code or time position. Aside from the extra Majority SIU, every other SIU having that value is gated off to a "DTX" (disable transmission) condition. The absence of data in the space assigned to an SIU may be interpreted by the receiver as a value equal to that of the Majority SIU. Power savings increase when there is more correlation between the SIUs, such that the Majority SIU is common to a relatively larger proportion of the signaling SIUs of the group. Examples of such majority signaling are set forth below, particularly in the context of multi-carrier, data only (MC-DO) communications. In MC-DO communications, signaling is needed in respect of a multiplicity of different carrier frequencies on which data packets are concurrently conveyed between a data source and a data receiver, and transmit power efficiencies may accrue from the correlation expected for such signaling. Data packet acknowledgment information (ACK/NAK), data rate control (DRC) information, and power control information are some examples of information that may be useful in respect of the group of different carriers that is active in an MC-DO connection.

One variation is applicable to acknowledgment signaling, and includes On/Off signaling employing a reserved bit as a "majority channel index" to indicate whether the majority of acknowledgment signals is ACK or NAK. This variation saves power, particularly in the worst-case situation in which packets must be concurrently acknowledged on a relatively large number of FLs, such as 15.

Majority Channel Index On/Off signaling may be implemented as follows. Majority ACK: If a majority of the supported channels (those for which acknowledgment is appropriate) receive good packets, then the Majority Channel Index is transmitted as a +1 symbol. In this event, no active symbol ACKs are transmitted, but rather the symbols are DTXed (zero, or no symbol, is transmitted). An active symbol −1 is transmitted for each of the minority of carriers for which packets were incorrectly received. Majority NAK: If, however, the majority of carriers receive bad packets, then the Majority Channel Index is DTXed, as are all individual NAK symbols. In this case, an active symbol +1 is transmitted for each carrier/packet that was correctly received (ACK). As with other On/Off signaling, carriers not transmitting packets, or for which acknowledgment is otherwise unnecessary, are masked off and DTXed. There is no ambiguity because the data source station has sufficient information as to which signals are thus gated off.

Majority Channel Index On/Off signaling, as compared to simple On/Off signaling, can reduce maximum transmit power on the acknowledgment channel (ACK channel) by almost 50%, as illustrated in the table below with a few examples. Note that the savings of this signaling protocol do not rely on signaling acknowledgment on a single RL channel, or on using a particular coding or transmission scheme.

The table below illustrates majority channel ACK signaling. The power required for transmit in the single-carrier case is represented as P. In the second row, a variable integer "A" represents the number of packets that are correctly received (ACKs).

TABLE 1

| # of FLs to acknowledge | # of ACKs ("A") | # of NAKs | # of unused Channels | Power w/o Majority Channel | Majority Channel Signaling | Power w/ Majority Channel |
|---|---|---|---|---|---|---|
| 14 | 12 | 2 | 1 | 12P | 1 | P + 2P |
| 15 | 8 < A < 16 | 15-A | 0 | AP | 1 | (16 − A)P < AP |
| 15 | 8 | 7 | 0 | 8P | 1 | P + 7P |
| 15 | 7 | 8 | 0 | 7P | 0 | 7P |
| 7 | 4 | 3 | 0 | 4P | 1 | P + 3P |
| 3 | 0 | 3 | 0 | 0P | 0 | 0P |
| 3 | 1 | 2 | 0 | P | 0 | P |
| 3 | 2 | 1 | 0 | 2P | 1 | P + P |
| 3 | 3 | 0 | 0 | 3P | 1 | P |

Joint Maximum Likelihood Analysis

Joint Maximum Likelihood techniques increase the robustness of the acknowledgment signaling. As with Majority Channel Indexing, this gain is largely independent of transmission implementation.

A Joint Maximum Likelihood decision algorithm helps to ensure reliable detection performance for the acknowledgment signaling described above, as well as for many other signaling methods. For ACK channel signaling schemes that map the ACK signal for each channel (or carrier) on an orthogonal basis over the time interval of interest, the noises for each ACK sub-channel are all i.i.d. under AWGN.

Let $$x(t) = \sum_{i=0}^{K} \mu_i w_i(t) + n(t).$$

After de-spreading with individual normalized orthogonal (orthonormal) cover $w_i(t)$, $x_i = \mu_i + n_i$, ($0 <= i <= K$). Here $n_i$ are uncorrelated because $w_i(t)$ have an orthonormal basis. The joint maximum likelihood decision is therefore selected among all the "legal" (i.e., currently permitted) ACK/NAK/OFF combinations. Based on the definition above, there are two groups of such "legal" combinations, depending on the current Majority Feedback:

Majority Feedback=ACK: Others are either OFF or NAK each decidable individually by comparing between likelihood of ACK and OFF.

Majority Feedback=NAK: Others are either OFF or ACK NAK each decidable individually by comparing between likelihood of NAK and OFF.

Recall that $$LL = \prod_{i=0}^{K} \frac{e^{-\frac{(x_i-\mu_i)^2}{2\sigma^2}}}{\sqrt{2\pi}\,\sigma},$$

where $\mu_i = -1, 0, 1$, $i = 0, \ldots, K$. Consequently:

$$LL(1) = \frac{e^{-\frac{(x_0-1)^2}{2\sigma^2}}}{\sqrt{2\pi}\,\sigma} \prod_{i=1}^{K} \frac{e^{-\frac{(x_i-\mu_i)^2}{2\sigma^2}}}{\sqrt{2\pi}\,\sigma}$$

$$= \frac{e^{-\frac{(x_0-1)^2}{2\sigma^2}}}{\sqrt{2\pi}\,\sigma} \prod_{i=1}^{K} \frac{e^{-\frac{[\min((x_i)^2,(x_i+1)^2)]}{2\sigma^2}}}{\sqrt{2\pi}\,\sigma}, \text{ where}$$

$$LL(0) = \frac{e^{-\frac{(x_0)^2}{2\sigma^2}}}{\sqrt{2\pi}\,\sigma} \prod_{i=1}^{K} \frac{e^{-\frac{(x_i-\mu_i)^2}{2\sigma^2}}}{\sqrt{2\pi}\,\sigma}$$

$$= \frac{e^{-\frac{(x_0)^2}{2\sigma^2}}}{\sqrt{2\pi}\,\sigma} \prod_{i=1}^{K} \frac{e^{-\frac{[\min((x_i)^2,(x_i-1)^2)]}{2\sigma^2}}}{\sqrt{2\pi}\,\sigma}, \text{ where}$$

$$\mu_0 = 0 \cdot \mu_i = \begin{array}{c} \mathrm{argmin}((x_i - \mu_i)^2), i = 1, \ldots, K. \\ \mu_i = 0, 1 \end{array}$$

Implementing Majority Signaling

Majority Signaling is particularly useful in conjunction with multi-carrier communications using a significant number of carriers. In such circumstances, channel conditions may vary from carrier to carrier, requiring an ability to address each carrier individually. At the same time, general correlation is probable between the multiplicity of different carriers that are conveying information to a single receiver. A high correlation between the channel responses for the various carriers should translate into a high majority/minority signal ratio. The efficiency increases as the proportion of signals represented by the majority increases (high majority/minority signal ratio), because only the majority indicator itself, plus the minority signals, need be transmitted.

Figure 5:
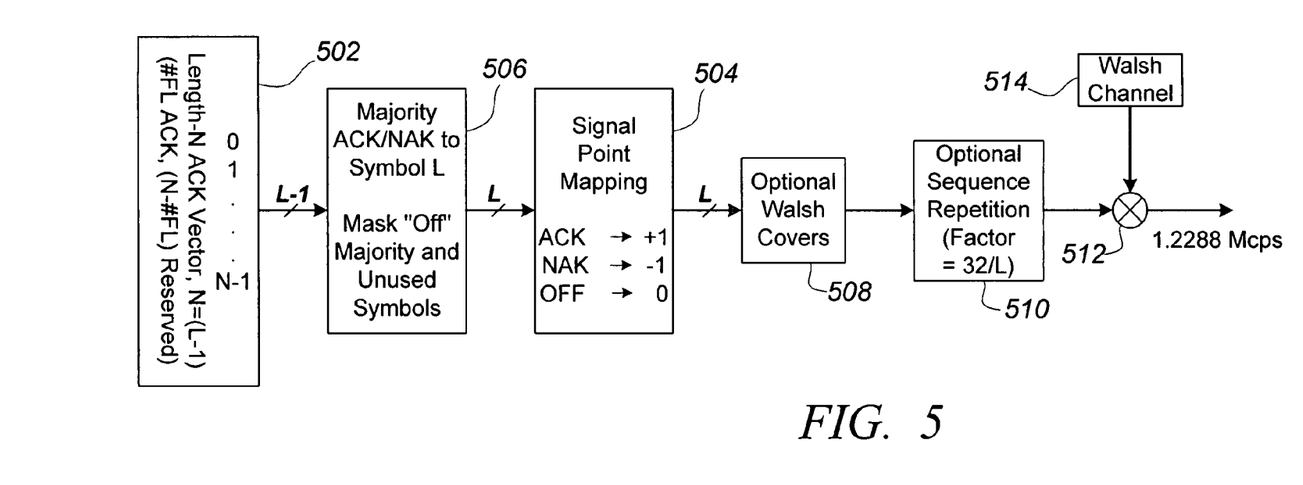
FIG. 5 is a block diagram of processing steps for exemplary acknowledgment signaling in groups using majority signaling techniques.

As illustrated by FIG. 5, majority signaling of ACK/NAK signaling does not rely upon combining a multiplicity of ACK symbols into a single sequence, for transmission on a single Walsh channel, as described above with reference to FIG. 2. At a block 502, an ACK vector is determined to represent the number of forward link channels being acknowledged concurrently (#FL). #FL≦N, N=(L−1). L may be a fixed number, such as 16, but it may also be variable. For this description, it will be assumed to be equal to 16, the largest value in accordance with maximum-15 carrier multi-carrier operation as described above. The length-N vector of ACK/NAK values advances to a block 506, where the majority value of the N particular ACK/NAK values is determined as ACKmajority. Each vector value equal to ACKmajority is masked "off." Next, the ACK vector is extended by one to length L, and the Lth ACK vector value is set to ACKmajority. Thus, in the lengthL ACK vector, the minority values remain, together with one ACKmajority value in the Lth position. For example, if #FL=15, and 12 of the values in block 502 are ACK, then the block 506 produces a length-16 ACK vector having 3 NAK values, 1 ACK value (in position L), and 12 "off" values. The lengthL ACK vector from block 506 advances to a block 504, where it is mapped to symbols, such as +1 for a value of "ACK," −1 for a value of "NAK", and 0 for a value of "off."

Two processing steps for the ACK symbol vector produced in the block 504 are optional. Processing may proceed as described above with reference to FIG. 2, thereby generating Walsh-code distinguished ACK values that are repeated and modulated at a modulator 512 by a single Walsh channel 514. According to this alternative, the mapped ACK symbols from the block 504 may be distinguished by encoding each with a different Walsh code in a block 508. The resulting sequence may then be repeated at a block 510 to produce as many repetitions as possible given the value of L. However, any alternative processing may be performed without departing from the spirit or scope of the disclosed methods and apparatus. For example, the processing of blocks 508 and 510 may be bypassed, and each of the L may be modulated at the modulator 512 onto a different Walsh channel, such as may be associated with the particular carrier represented by the ACK value. In either event, the number of active symbols, whether +1 or −1, is reduced by use of majority signaling, resulting in a reduction in transmit power as illustrated in Table 1 above.

Majority signaling may be extended to other signaling needs, particularly for multi-carrier communications. Data rate control (DRC) and/or power control signaling, for example, may be separately transmitted for each carrier. Relative signaling (increase "+", decrease "−", or no change "0") may be used to satisfy these signaling needs. The current majority indication for any group of such relative signals will comprise either "increase", "decrease", or "no change." The group may ideally be well-correlated, such as may be expected when each indication applies to one of a multiplicity of carriers being transmitted to a single receiver in an MC-DO system, as described in more detail above. The value determined to be the current majority value may be conveyed by a reserved symbol identified as SignalMajority. For example, if the current majority is "increase," then the SignalMajority value will be "increase," which may map to "+1." Analogously, a SignalMajority value of "decrease" may be mapped to "−1," and a SignalMajority value of "no change" may be mapped to "off." When the SignalMajority value is determined, all examples of such signal may be mapped to "off." Thus, if SignalMajority is "increase" and is represented by "+1," all "increase" values will be mapped to "off." As such, "no change" and "decrease" indications must be mapped to the two active values of +1 and −1. Any mapping may be used by convention. However, for simplicity, "no change" indications may be mapped to "+1" when SignalMajority is "increase," and may be mapped to "−1" when SignalMajority is "decrease." In a further example, the majority indication may be "decrease" (SignalMajority is decrease). In that case, the reserved bit may be mapped to "−1," and all "no change" indications may also be mapped also to "−1," while all "increase" indications are mapped to "+1." Alternative mappings may be used by convention.

The foregoing describes ACK signaling and tristate relative signaling (increase, decrease, no change). However, multiple-state signals may also benefit from majority signaling. For example, both power control and DRC may be represented by absolute number values, which require multiple-state indications, rather than relatively, which requires no more than three states. Both majority signaling and on/off signaling can still save power for such multi-state signaling. In one type of On/off signaling, for example, multi-state signaling values may be gated off unless the value is being changed, and then such value may be represented by a usual signal. As a particular example, the usual multi-bit sequences that represent a DRC level may be transmitted only when such information is new, and otherwise be gated off.

Majority signaling of a multiple-state signal is also possible. Majority signaling of a multi-state DRC value, for example, may be implemented using a reserved data unit that is sufficiently large to convey an identity of the current DRC majority value. Any available data unit may be used. For MC-DO operation using up to 15 carriers to convey data to a single receiver, some implementations will employ a separate Walsh cover for DRC for each allowed carrier. When this is done, a 16th Walsh cover will typically be reserved, and may be employed to convey the current majority value.

Figure 6:
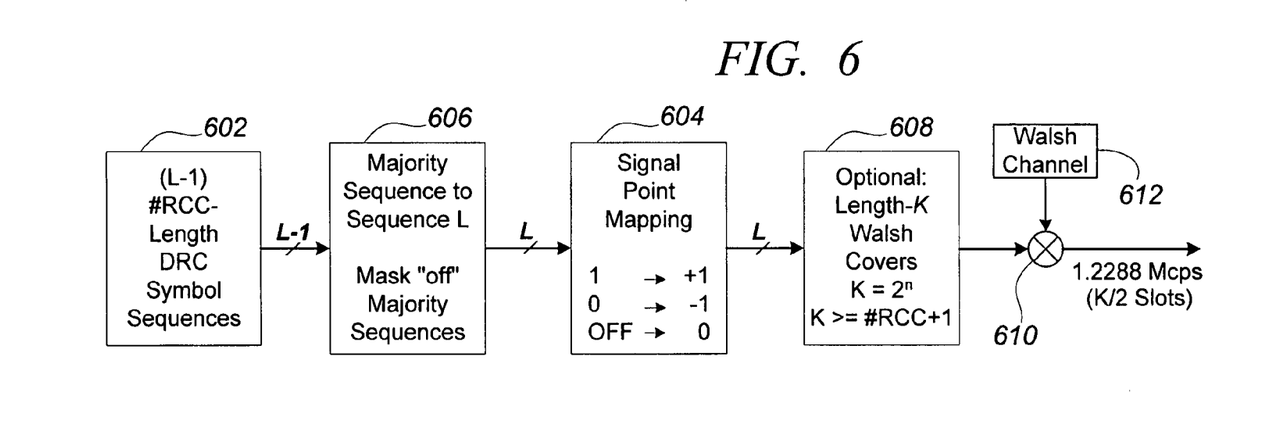
FIG. 6 is a block diagram of processing steps for DRC channel processing as an example of multi-state majority signaling techniques.

FIG. 6 illustrates such multi-state sequence majority signaling. As an example, L is treated as 16, the value it may take on when the number of rate controlled channels (#RCC) is 15. Other values of #RCC may be similarly used. In block 602, a DRC symbol sequence has been determined for each of the #RCC (here, 15=L−1) rate controlled channels. The sequences may comprise any agreed upon sequence, for example such as is described in any relevant CDMA standard, and will have a length of "DRClength" by convention. The (L−1) sequences advance to block 606, at which point the sequence that is the most common, and appears more than once, is deemed the majority sequence. In the event of a tie, the choice of majority sequence is arbitrary. The determined majority sequence is made the Lth sequence. Every specific instance of such sequence is masked to "off." L sequences advance to a block 604, at which block the sequence bits are mapped to symbols. The mapping is somewhat arbitrary. The mapping may, for example, represent each digital bit of value "1" by the symbol "+1" and each digital bit of value "0" by the symbol "−1" while the "off" condition is mapped to no signal, or 0 (DTX).

Alternative mappings are possible. ON/OFF signaling may be used, in addition to masking off majority sequences, as long as all unmasked sequences include at least one bit that is active, so that such sequence can be distinguished from a sequence having the majority value. In some embodiments of the disclosed method and apparatus, the following mapping rule is used in order to avoid ambiguity and still save power when performing ON/OFF keying: for Majority ACK, the Majority signal is ON, and all signaling for NACKs are also ON (i.e., the other channels that are also turned ON represent an "OFF"); for Majority NACK, only the signaling for ACKs are ON.

After the DRClength digital sequences are mapped to symbols in the block 604, the process may optionally advance to a block 608. There, each symbol of each particular sequence may be mapped to a Walsh cover of length K that is sufficiently large to orthogonally encode (#RCC+1) sequences. The value K may be selected as the smallest value for which $K=2^n$ and $K>=\#RCC+1$. Length-K Walsh covering of each symbol of the incoming DRClength sequences converts the #RCC incoming DRClength sequences to a single DRClength sequence. The resulting length (K*DRClength) sequence may be modulated by a modulator 610 with a Walsh channel 612 at the chip rate (e.g., 1.2288 Mcps). As described with respect to FIG. 4, the final sequence may extend over up to 8 standard slots, depending upon the #RCC of FL carriers for which DRC is being provided.

If the optional block 608 Walsh conversion is not employed, an alternative will be to modulate each of the L sequences with a different Walsh channel at the mixer 610. Other methods of encoding the DRC sequences may also be employed. However it is done, the number of active signals transmitted will be reduced on average, even for majority sequences that are represented only twice amongst the #RCC sequences to be conveyed. Correlation between the performances of different carriers should ensure that majority sequences are typically represented more than twice. Thus, majority signaling of plural-bit sequences result in at least some transmission power reduction. The power savings increase as the number of RCCs being combined increases, and as the correlation between the transmitted sequences increases.

CONCLUSION

The foregoing description illustrates exemplary implementations, and novel features, of a method and system for transmitting related signaling information in groups, adding a representation of a majority value, and gating off signaling units that match the majority value. Although various alternative implementations are suggested, it is impractical to list all such alternatives. As such, the scope of the presented invention should be determined only by reference to the appended claims, and should not be limited by features illustrated in the foregoing description except insofar as such limitation is recited in an appended claim. The skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Thus, many more element combinations are contemplated as embodiments of the invention than can reasonably be enumerated explicitly herein. The scope of the invention may properly be defined only by the appended claims, rather than by the foregoing description. Moreover, however, the claims are themselves limited in number. As such, it is anticipated that further element combinations may be defined at a later time in accordance with continuation and divisional practice. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method of transmitting a group of related and common-sized signaling information units ("SIUs"), comprising:

a) determining N SIU values corresponding to each of N related SIUs to be transmitted;
b) selecting, from among the N SIU values determined in step (a), a majority SIU value that is equal to at least two of the N SIUs determined in step (a), wherein no other SIU value is equal to more of the N SIU values than is the majority SIU value;
c) indicating the majority SIU value in a MajoritySIU distinct from all of the N SIUs; and
d) transmitting the N SIUs and the MajoritySIU to a receiver as a signaling message having N+1 corresponding distinct SIU spaces within the signaling message, including
   i) transmitting, in the space corresponding to the MajoritySIU, a signal reflecting the value of the MajoritySIU,
   ii) transmitting, in the spaces corresponding to the SIUs having values unequal to the MajoritySIU value, if any, signals reflecting each such value, and
   iii) transmitting, in the spaces corresponding to the SIUs having values equal to the MajoritySIU, an absence of signal to reflect such values.

2. The method of claim 1, wherein the MajoritySIU and its corresponding space have identical information capacity as each of the N SIUs and their corresponding spaces.

3. The method of claim 1, wherein each of the N SIUs conveys one of two possible states.

4. The method of claim 3, wherein the N SIUs exclusively convey acknowledgment information.

5. The method of claim 4, wherein the N SIUs each convey acknowledgment information reflective of data transmitted on N corresponding different carrier frequencies on which information is being received from a particular transmitting station.

6. The method of claim 1, wherein each of the N SIUs conveys one of three possible states.

7. The method of claim 6, further comprising representing each of the three possible SIU states by different signals, depending upon which of the three states matches the MajoritySIU.

8. The method of claim 1, wherein each of the N SIUs conveys one of a multiplicity of possible states.

9. The method of claim 8, wherein each of the N SIUs conveys a data rate control (DRC) value.

10. The method of claim 9, wherein each of the N SIUs conveys a DRC value corresponding to a different carrier frequency on which information is being received from a particular transmitting station.

11. Communication apparatus for transmitting a group of related and common-sized signaling information units ("SIUs") to a particular receiving station, the apparatus comprising:

a) an SIU group value determination module configured to determine N SIU values corresponding to each of N related SIUs to be transmitted;
b) a MajoritySIU value determination module configured to determine a largest number, greater than one, of the N SIU values that are equal to each other, and to assign such SIU value as the MajoritySIU value;
c) a majority masking module configured to identify each of the N SIUs having a value matching the MajoritySIU, and to indicate that such SIU is to be represented in transmission by an absence of signal; and
d) a transmission signal preparation module configured to prepare a signaling message having N+1 assigned signal spaces corresponding to the N SIUs and the MajoritySIU, wherein each signaling message includes i) a signal reflecting the value of the MajoritySIU in the space corresponding to the MajoritySIU,
   ii) a signal reflecting the value of each SIU of the group the value of which is different from the MajoritySIU in the space corresponding to such SIU, and
   iii) an absence of signal in each space corresponding to an SIU having a value equal to the MajoritySIU value.

12. The apparatus of claim 11, wherein the MajoritySIU and its corresponding space have identical information capacity as each of the N SIUs and their corresponding spaces.

13. The apparatus of claim 11, wherein each of the N SIUs reflects one of two possible states.

14. The apparatus of claim 13, wherein the N SIUs exclusively convey data packet acknowledgment information.

15. The apparatus of claim 14, wherein the N SIUs each convey acknowledgment information that reflects data transmitted on N corresponding different-frequency carriers on which information is being received from a particular transmitting station.

16. The apparatus of claim 11, wherein each of the N SIUs reflects one of three possible states.

17. The apparatus of claim 16, wherein the transmission signal preparation module is further configured to dispose a different signal in each space corresponding to one of the N SIUs depending upon which state matches the MajoritySUI.

18. The apparatus of claim 11, wherein each of the N SIUs conveys one of a multiplicity of possible states.

19. The apparatus of claim 18, wherein each of the N SIUs conveys a data rate control (DRC) value.

20. The apparatus of claim 19, wherein each of the N SIUs conveys a DRC value corresponding to a different carrier frequency on which information is being received from a particular transmitting station.

* * * * *